(12) United States Patent
Steval

(10) Patent No.: US 6,771,184 B1
(45) Date of Patent: Aug. 3, 2004

(54) DATA DEVICES

(76) Inventor: Michael Steval, Opley (GB)

(*) Notice: Subject to any disclaimer, the term of this patent is extended or adjusted under 35 U.S.C. 154(b) by 668 days.

(21) Appl. No.: 09/654,629

(22) Filed: Sep. 5, 2000

(30) Foreign Application Priority Data

Sep. 7, 1999 (GB) ............................................. 9920989

(51) Int. Cl.[7] .............................................. G08C 19/00
(52) U.S. Cl. ............................ 340/870.16; 340/870.17; 348/553; 725/68
(58) Field of Search ...................... 340/870.17, 870.16; 725/68, 133, 141, 153; 348/553, 155

(56) References Cited

U.S. PATENT DOCUMENTS 5,822,012 A * 10/1998 Jeon et al. .................. 348/553

FOREIGN PATENT DOCUMENTS

| EP | 2 319 616 A | 5/1998 | ............ G01K/1/02 |
| JP | 08084285 | 3/1996 | ........... H04N/5/232 |
| JP | 10257399 | 9/1998 | ............ H04N/5/44 |

* cited by examiner

*Primary Examiner*—Timothy Edwards
*Assistant Examiner*—Hung Dang

(57) ABSTRACT

A system for gauging, measuring or recording data. The system includes a detection mechanism external of a premises which is connected to transmit data to a device within the premises for processing or display of the data. The internal device includes a receiver for receiving and broadcasting broadcast data transmitted to a receiving device external of the premises and wherein data from the detection mechanism is carried to the internal device along the connection between the receiving device and the internal mechanism and wherein the data is processed and is accessible by at least one further control mechanism.

8 Claims, 1 Drawing Sheet

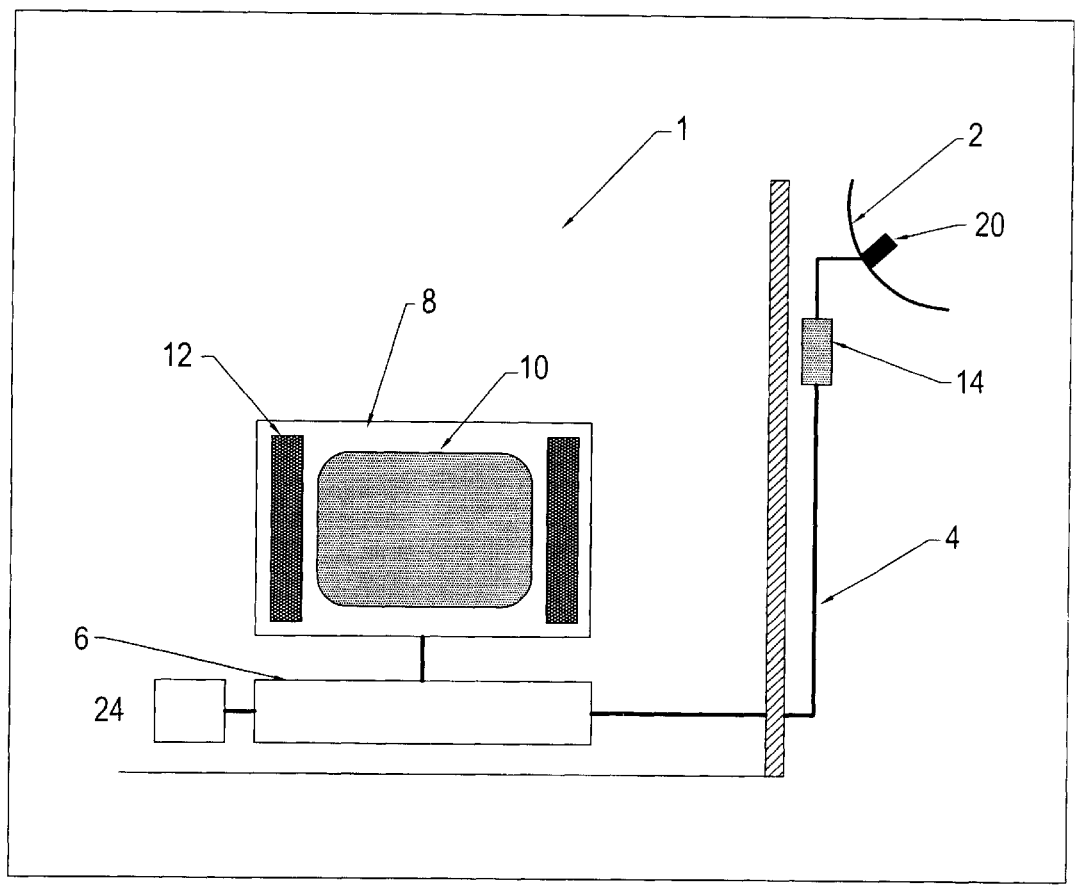

DATA DEVICES

CROSS-REFERENCE TO RELATED APPLICATIONS

This application claims priority to GB Application No. 9920989.2 filed Sep. 7, 1999.

BACKGROUND OF THE INVENTION

The invention to which this application relates is a system whereby information from a remote source such as, but not exclusively a temperature gauge external of a premises, can be received, processed and displayed using apparatus provided within the premises.

It is known to provide many different forms of apparatus to measure certain conditions and one form of apparatus is an external temperature gauge which allows readings to be displayed on display apparatus to which the same is connected and which is exclusively for use with that apparatus. A disadvantage of this is however that the display apparatus is normally required to be provided specifically for that purpose and as a result the apparatus can be expensive and the connecting cabling required to connect the gauge or other instrument to the apparatus can also be expensive. One form of apparatus which is present in most premises is television apparatus which comprises a display screen and data receiving and processing apparatus within the premises and a data receiving aerial or satellite dish which is mounted externally of the premises and connected to the receiver apparatus by cabling.

SUMMARY OF THE INVENTION

The aim of the present invention is to provide a means whereby apparatus mounted externally of a premises can be connected to display and/or processing apparatus within a premises using television apparatus provided at the premises and to allow the data received from the apparatus externally can be used in the control of further apparatus.

In a first aspect of the invention there is provided a system for gauging, measuring or recording data relating to a detectable criteria externally of a premises, said system comprising a detection means externally of the premises connected to transmit data to apparatus within the premises for the processing and/or display of the data received, said apparatus internally of the premises including a receiver for receiving and processing broadcast data transmitted to receiving apparatus mounted externally of the premises and characterised in that the data from the detecting means is carried to the apparatus within the premises along a connection between the receiving apparatus and the apparatus in the premises and said data is processed and accessible by at least one further apparatus control means for apparatus internally or externally of the premises and control of the said apparatus can be responsive to the data received from the detecting means.

In one embodiment, the data from the device is transferred to the receiver which has the ability to process the data and display readings on the display screen to which the receiver is connected. In a further embodiment the receiver has the capability or is connected to apparatus which has the capability to process the received data and use it in the control of other devices or apparatus within or externally of the premises.

In one embodiment the device mounted externally of the premises is a temperature gauge and the data from the same is processed by the receiver to generate a display on screen of the temperature reading obtained. In addition the data is processed by control apparatus for reference in the control of the heating system for the premises with the external temperature used as a parameter which is taken into account in the control of the heating levels required and/or activation of the heating apparatus. The same control system can be used for heating water in the premises.

In alternative embodiments the devices could be sensors to determine whether plants are required to be watered and data from the same can be displayed on screen and/or passed to a watering control system. Person detection systems could be utilised to determine the presence of a person externally of the premises and the data used to arm a security system for the premises or activate some other function within the premises prior to the person entering the premises. Thus it will be appreciated that the ability to connect the detection means with a connection between external and internal apparatus is of potential benefit and allows the same to be achieved economically.

In whichever embodiment the detection means may be formed as an integral component of the satellite dish or aerial.

BRIEF DESCRIPTION OF THE DRAWING

FIG. 1 is a schematic view of the broadcast data reception system of this invention.

DETAILED DESCRIPTION OF THE PREFERRED EMBODIMENT

A specific embodiment of the invention is described with reference to the accompanying drawing which shows an embodiment of a system in accordance with the invention.

The drawing shows in schematic fashion a broadcast data reception system for use in a premises 1. The system comprises a satellite dish 2 which is mounted externally of the premises for the reception of data transmitted from a remote location via a satellite or a number of satellites, typically by a system broadcaster such as British Sky Broadcasting. The satellite dish is connected via cable 4 to a receiver 6 provided internally of the premises 1. The receiver is sent the received data from the satellite dish and has a processing capability which allows the decoding of the data into a form from which television programs and other information can be generated. The information and programs generated can be displayed to a user of the apparatus via a display screen 10 and speakers 12 of a television set 8 to which the receiver is connected.

This form of system is now well known in many premises and with the increasing popularity of digital broadcast systems these systems are likely to become increasingly prevalent.

The drawing also illustrates how the present invention can be incorporated with the existing system and there is shown a detection means, in this form a temperature gauge 14, mounted externally of the premises 1. The gauge can be of any suitable type but it is envisaged that a digital 1 wire or 2 wire temperature sensor (eg that sold as Max675LH) can be provided or alternatively an adaptor module for fitment to the satellite dish cable inline can be provided which includes an analogue temperature sensor. It should be appreciated that the gauge or any other form of detection means can be formed as an integral part of the satellite dish or of any data antenna which is used so that no additional wiring or communication means is required to that which would in any case be provided.

The satellite dish includes a Low noise block (LNB) component via which the data is received and transferred to the receiver and the detection means is connected to a Low noise block digital satellite equipment controller (DiSEqC) or to an additional microcontroller. The DiSEqC interface/ protocol is then used to transmit the data from the detection means at the satellite dish in a form to be processed by the receiver and, if required, processed to allow the same to be selected for viewing by the user of the apparatus within the premises via the display screen.

The system can also include the ability to set parameters which, if the data from the device indicates that they have been exceeded, causes an alarm to be generated.

Yet further the data received from the device can be processed to cause an onscreen display to be generated and/or the data can be further processed to influence controls for other functions in the premises such as, for example, the data from a temperature detection means can be accessed by control means for the heating control system for the premises.

In this case the external temperature data can be introduced as a parameter of the calculations undertaken in the level of heating required and/or the operation of the heating and/or the duration of the heating activation. For example, if the temperature in the house in early morning is cool but the external temperature data indicates that the temperature outside is rising quickly due to sunlight the heating control system may not operate the heating. However if the temperature inside is cool and the external temperature is cold the heating will be operated as there is no indication that the temperature in the house will increase in the near future.

Similarly, the watering of plants can be controlled with reference to external temperature data and/or a rainwater gauge data externally of the premises and so it will be appreciated that the detection means data received and processed internally of the premises by the receiver can be utilised in a number of ways.

In whichever format the control system for the further apparatus can be provided as part of the receiver processing capability or may be connected to the receiver via cabling or remote communication medium provided to allow access to and transmission of the relevant data.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed is:

1. A system for gauging, measuring or recording data relating to a detectable criteria externally of a premises, said system comprising a detection means externally of the premises connected to transmit data to an apparatus within the premises for the processing and/or display of the data received, said apparatus internally of the premises including a receiver for receiving and processing broadcast data transmitted to a receiving apparatus mounted externally of the premises and wherein said data from said detection means is carried to said apparatus within the premises along a connection between said receiving apparatus and said apparatus in the premises and said data is processed and accessible by at least one further apparatus control means for said apparatuses internally or externally of the premises and control of the apparatus can be responsive to said data received from the detection means.

2. A system according to claim 1 wherein said data from said detection means is transferred to said receiver which includes a processing means to process said data and generate a display on the display screen to which said receiver is connected.

3. A system according to claim 1 wherein said receiver processes the received data and controls said further apparatus within or externally of the premises in response to the received data.

4. A system according to claim 1 wherein said detection means mounted externally of the premises is a temperature gauge and the data from the temperature gauge is processed by said receiver.

5. A system according to claim 4 wherein said data received from the temperature gauge is processed and passed to control apparatus for a heating system for the premises as a parameter which is taken into account in the control of the heating apparatus.

6. A system according to claim 1 wherein said detection means is provided as an integral component of said receiving apparatus mounted externally of the premises for receiving broadcast data.

7. A system according to claim 1 wherein said receiving apparatus is any of a satellite dish, antenna or aerial.

8. A system according to claim 1 wherein said data from the detection means is carried and processed via a low noise block (LNB) component provided in said receiving apparatus with said detection means connected to a low noise block digital satellite equipment controller (DiSEqC) and said controller is used to transmit said data from the detection means to said receiver.

* * * * *

UNITED STATES PATENT AND TRADEMARK OFFICE
CERTIFICATE OF CORRECTION

PATENT NO. : 6,771,184 B1
DATED : August 3, 2004
INVENTOR(S) : Michael Steval

It is certified that error appears in the above-identified patent and that said Letters Patent is hereby corrected as shown below:

<u>Title page,</u>
Item [73], Assignee, insert
-- (73)   Assignee, Pace Micro Technologies, PLC, Saltaire Shiplex, England --

Signed and Sealed this

Nineteenth Day of October, 2004

JON W. DUDAS
*Director of the United States Patent and Trademark Office*